United States Patent [19]
Rudi

[11] Patent Number: 4,775,910
[45] Date of Patent: Oct. 4, 1988

[54] ARRANGEMENT FOR CLEANING A MAGNETIC HEAD IN A MAGNETIC TAPE RECORDER

[75] Inventor: Guttorm Rudi, Fjellhamar, Norway

[73] Assignee: Tandberg Data A/S, Oslo, Norway

[21] Appl. No.: 841,258

[22] Filed: Mar. 19, 1986

[30] Foreign Application Priority Data

Apr. 2, 1985 [DE] Fed. Rep. of Germany ....... 3512049
Oct. 24, 1985 [DE] Fed. Rep. of Germany ....... 3537895

[51] Int. Cl.⁴ .................. G11B 5/41; G11B 23/087
[52] U.S. Cl. ................................. 360/128; 360/132
[58] Field of Search ............. 360/105, 109, 128, 132, 360/137; 206/387; 242/197, 199; 15/210 R, DIG. 12

[56] References Cited

U.S. PATENT DOCUMENTS

| | | | |
|---|---|---|---|
| 2,819,350 | 1/1958 | Steinegger | 360/105 X |
| 3,558,141 | 1/1971 | Suzuki | 360/109 |
| 4,248,393 | 2/1981 | Mogi | 242/199 |
| 4,272,796 | 6/1981 | Van Kreuningen et al. | 360/128 |
| 4,445,158 | 4/1984 | Clausen et al. | 360/137 |
| 4,470,088 | 9/1984 | Fick | 360/105 |
| 4,586,099 | 4/1986 | Suzuki et al. | 360/128 |
| 4,631,614 | 12/1986 | Davis et al. | 360/128 |

FOREIGN PATENT DOCUMENTS 48-2727 4/1973 Japan .
52-18306 2/1977 Japan ................... 360/128
59-22217 2/1984 Japan ................... 360/137

OTHER PUBLICATIONS

Brew et al., "Head Cleaning Cartridge", IBM Tech. Disc. Bull., vol. 21, No. 9, Feb., 1979.
Wada, "Cartridge Type Cleaning Pack", Patent Abstracts of Japan, vol. 7, No. 202, 9/7/83.

Primary Examiner—A. J. Heinz
Assistant Examiner—Benjamin E. Urcia
Attorney, Agent, or Firm—Hill, Van Santen, Steadman & Simpson

[57] ABSTRACT

For cleaning a magnetic head in a magnetic tape recorder, the cassette is provided with a cleaning device and is inserted in the magnetic tape recorder instead of a magnetic tape cassette. The cleaning device contains a cleaning element located at a carrier, the cleaning element pressing against the front side of the magnetic head instead of the magnetic tape and converting a rotary motion of a drive arrangement which normally drives the magnetic tape into a reciprocating motion and, under given conditions, simultaneously converting the rotary motion into a pivoting or rotational motion of the cleaning element relative to the magnetic head. The tape drive capstan of the magnetic tape recorder preferably serves a drive arrangement and the carrier is driven via an eccentric shaft which may be inclined relative to its rotational axis and via a worm gearing driven by the tape drive capstan.

14 Claims, 3 Drawing Sheets

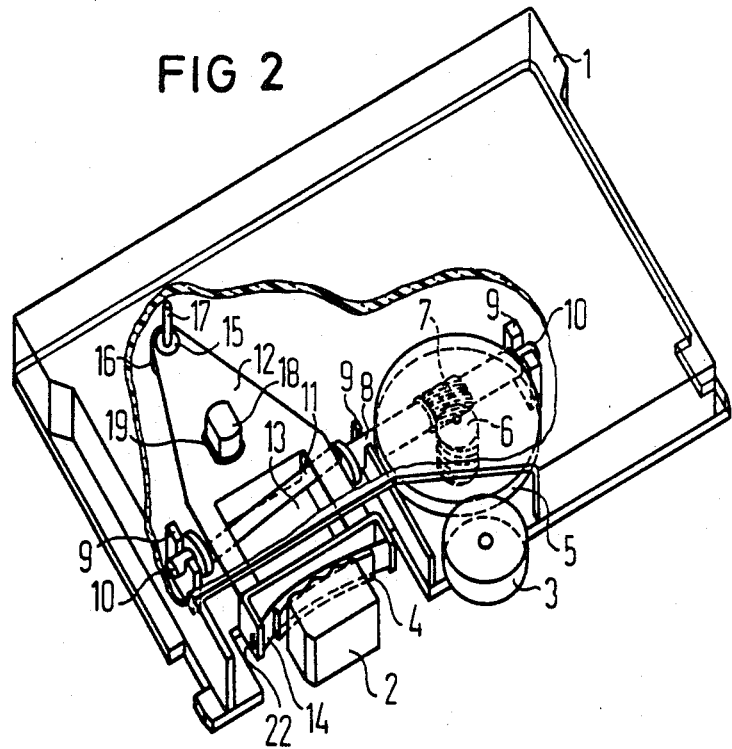

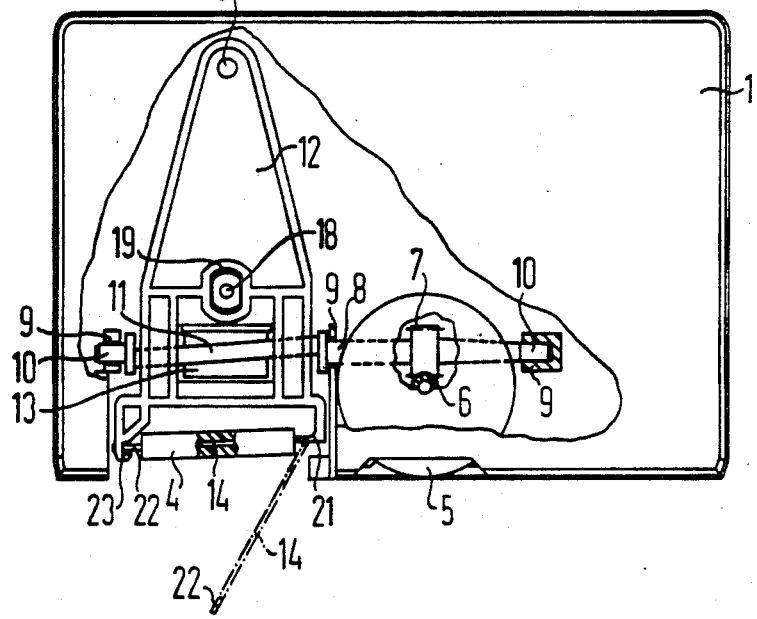
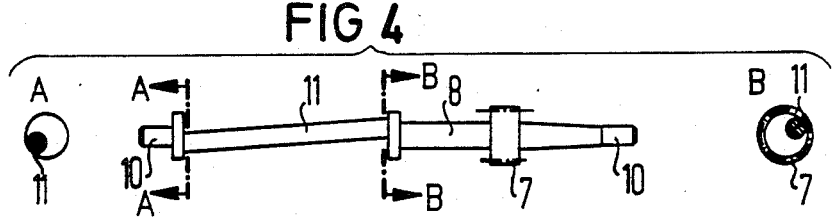
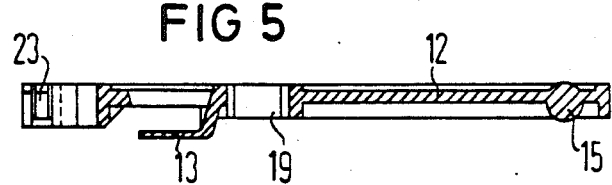
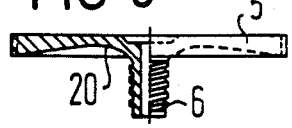

ARRANGEMENT FOR CLEANING A MAGNETIC HEAD IN A MAGNETIC TAPE RECORDER

BACKGROUND OF THE INVENTION

1. Field of the Invention

The present invention relates to an arrangement for cleaning a magnetic head in a magnetic tape recorder using a cassette provided with a cleaning device, the cassette being introduced into the magnetic tape recorder instead of a cassette provided with a magnetic tape, and being driven by a drive arrangement of the recorder.

2. Description of the Prior Art

It is already generally known in the art to employ a cassette for cleaning a magnetic head in a magnetic tape recorder, the cassette being inserted into the magnetic tape recorder instead of a cassette which is provided with magnetic tape. Instead of the magnetic tape, these cassettes contain a cleaning tape having a rough surface, the cleaning tape being driven in the same manner as the magnetic tape by way of the tape drive capstan and/or via the tape winding.

Given the utilization of such a cassette, the cleaning therefore occurs in the running direction of the magnetic tape. Given frequent operation of the magnetic tape recorder, however, there is a danger that the magnetic tape will form countersinks on the magnetic head which can lead to slight depressions at the front side of the magnetic head in the region of the magnetic tape. Since the cleaning tapes comprise a rough surface, these depressions are further intensified by the cleaning tape.

U.S. Pat. No. 4,272,796, fully incorporated herein by this reference, discloses an arrangement for cleaning a magnetic head in a magnetic tape recorder wherein a cleaning device is provided in a cassette. The cleaning device is composed of an eccentric arrangement which is driven by the drive arrangement of the magnetic tape recorder which drives the tape reel. A cleaning element executes a reciprocating motion in the moving direction of the magnetic tape. In a further embodiment, a wedge is provided at a drive wheel, the wedge executing a motion of the cleaning element perpendicular to the moving direction of the magnetic tape.

A further arrangement for cleaning a magnetic head in a magnetic tape recorder is disclosed in the Japanese patent application No. 50-93774 (Kokai No. 52-18306), also fully incorporated herein by this reference. Therein, also, a cleaning element located at a lever is driven in a cassette by a drive wheel and is moved perpendicular to the moving direction of the magnetic tape. The drive wheel comprises a wave-shaped depression at its circumference.

SUMMARY OF THE INVENTION

The object of the present invention is to provide a further arrangement for cleaning a magnetic head in a magnetic tape recorder, the arrangement guaranteeing a reliable cleaning of the magnetic head and nonetheless requires a relatively low expense.

The above object is achieved in an arrangement for cleaning a magnetic head in a magnetic tape recorder, using a cassette provided with a cleaning device, the cassette being introduced into the magnetic tape recorder in place of a normal magnetic tape cassette and being driven by a drive arrangement of the tape recorder, and is particularly characterized in that the cleaning device contains an eccentric arrangement driven by the drive arrangement of the tape recorder, the eccentric arrangement converting the rotational motion of the drive arrangement into a reciprocating motion of a cleaning element of the cleaning device relative to the magnetic head and perpendicular to the moving direction of a magnetic tape.

The arrangement is further particularly characterized in that the cleaning device contains an eccentric arrangement driven by the drive arrangement of the magnetic tape recorder, the eccentric arrangement converting the rotational motion of the drive arrangement into a pivoting motion of the cleaning element relative to the magnetic head.

The cassette of the present invention has the advantage that it is versatily useable and comprises extremely good cleaning properties since the cleaning element executes a reciprocating motion relative to the magnetic head, which differs from the running direction of the magnetic tape. Deposits on the magnetic head which collect behind the irregularities of the magnetic head are therefore also covered. Moreover, the formation of depressions in the region of the magnetic tape is not additionally promoted when cleaning the magnetic head.

Particularly good cleaning properties of the arrangement are achieved when, instead of the reciprocating motion of the cleaning element perpendicular to the direction of motion of the magnetic tape or in addition to this reciprocating motion, a pivoting motion of the cleaning element is executed. This pivoting motion can also be interpreted as a partial rotational motion or an oscillatory motion in the plane of the magnetic tape.

According to a preferred embodiment of the invention, the eccentric arrangement contains an eccentric shaft which is driven via a worm gear and a drive pinion and which is at least partially embraced by a carrier provided with a cleaning element.

The pivoting motion of the cleaning element is achieved in that the eccentric shaft is fashioned in an inclined manner. For example, the ends of the eccentric shaft can be turned relative to one another by an angle of roughly 60°.

The worm gearing is preferably formed of a worm driven by a drive pinion and of a worm wheel located on a shaft of the eccentric arrangement. The drive pinion is thereby driven by the tape drive capstan normally moving a magnetic tape or is driven by a drive arrangement of the magnetic tape recorder turning a reel with the magnetic tape. In the former case, the drive pinion is advantageously fashioned as a friction wheel.

In order to integrate the cleaning device in a cassette, it is favorable when the drive pinion or drive wheel is immediately connected to a worm of the worm gearing and comprises a depression for an appertaining worm wheel.

The bearing of the carrier provided with the cleaning element advantageously occurs upon use of a spherical portion connected to the carrier, the spherical portion resting on a corresponding ball socket connected to the cassette and being arranged at that end of the cassette lying opposite the cleaning element.

In addition to the reciprocating motion perpendicular to the direction of movement of the magnetic tape and, given conditions, in addition to the pivoting motion, a motion of the cleaning element in the direction of the magnetic tape can also be executed. In case this is desirable, a guide pin is advantageously provided, the guide pin guiding the carrier via a corresponding recess during its reciprocating motion perpendicular to the direction of movement of the magnetic tape or during its pivoting motion.

The cleaning element is advantageously designed as a replaceable element. To this end, the cassette contains an additional opening in its cover. The cleaning element is located on a strip. This strip can be dilatably fashioned and can be replaced in common with the cleaning element. It proves advantageous, however, to arrange the cleaning element on a strip which is secured at the carrier in a pivotal and logical fashion. However, it also proves advantageous to arrange the cleaning element at a strip which is secured to the carrier in a pivotal and latchable fashion. The cleaning element is preferably provided with a longitudinal opening by way of which it can be interchangeably slipped onto the strip. The cleaning element can therefore be replaced in a very simple manner and, for example, can be turned over after a prescribed time interval so that the rear side can also be employed for cleaning.

For the purpose of replacement, the strip is preferably provided with an articulation at its one end, the articulation being secured to the carrier, and is provided with a catch nose at its other end, the catch nose being latchable in the carrier. When the carrier is fashioned with plastic, the articulation is preferably fashioned as a film hinge.

A particularly advantageous cleaning effect occurs when the cleaning element is located not parallel, but rather inclined, relative to the front edge of the cassette.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 2 is a perspective view, again shown partially broken away, of a cassette provided with a second embodiment of the invention;

FIG. 3 is a partially broken away plan view of a cassette provided with the second embodiment of the invention;

FIG. 4 is a schematic representation of an eccentric arrangement which may be employed in practicing the present invention;

FIG. 5 is a sectional view through a carrier which may be employed in practicing the present invention; and FIG. 6 is an illustration of a drive pinion, shown in partial section, which may be employed in practicing the present invention.

DESCRIPTION OF THE PREFERRED EMBODIMENTS

Figure 1:
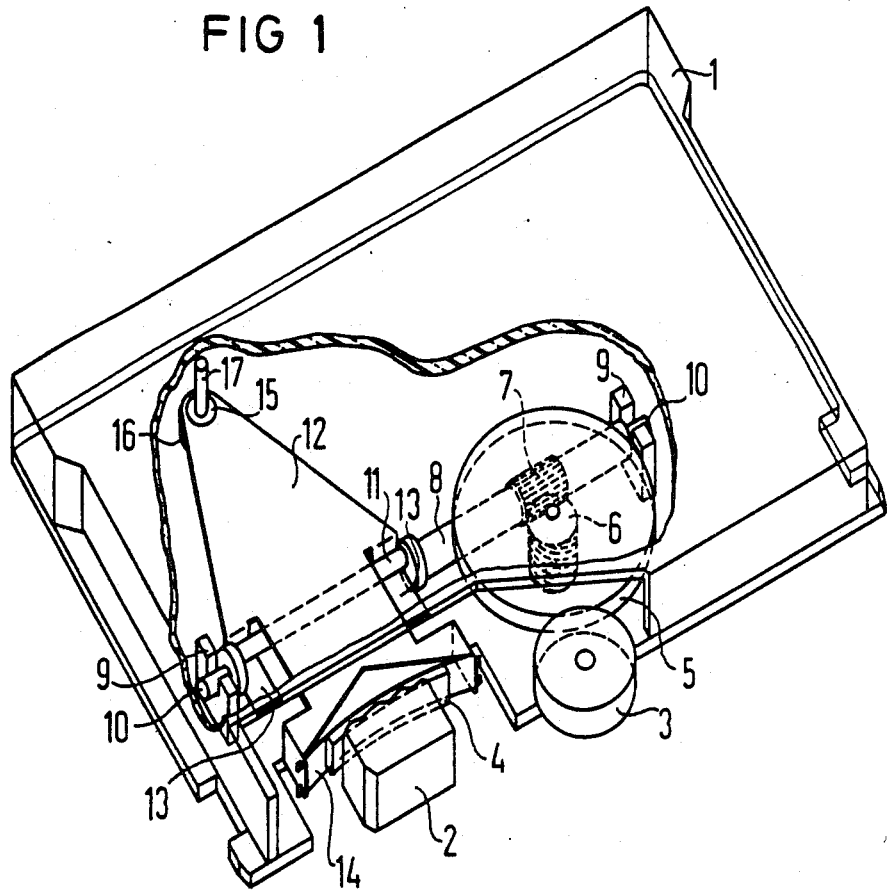
FIG. 1 is a perspective view, shown partially broken away, of a cassette which is provided with a first embodiment of the invention.

Referring to FIG. 1, a cassette 1 has outer dimensions which largely coincide with those of a commercially available cassette provided with magnetic tape which is also known as a ¼" cartridge. After the cassette 1 has been introduced into a corresponding magnetic tape recorder comprising a magnetic head 2 and a tape capstan drive 3 normally provided for the drive of the magnetic tape, a cleaning element 4 of a cleaning device contained in the cassette presses against the front side of the magnetic head 2. A drive wheel 5 of the cassette 1 is fashioned, for example, as a friction wheel and has a coating of rubber on its periphery. A worm 6 is located on the shaft of the drive wheel 5, the worm 6, for example, forming a structural unit with the drive wheel 5. The worm 6 is a portion of a worm gearing and is assigned to a worm wheel 7 located on an eccentric arrangement 8. The eccentric arrangement 8 is formed of a shaft 10 seated in two bearings 9 and an eccentric shaft 11. The worm wheel 7 is located on the shaft 10.

The eccentric shaft 11 is embraced by a carrier, first by its supporting surface and second by a lift 13. The cleaning element 4 is located at the carrier 12, at the front side thereof, the cleaning element 4 being fashioned, for example, felt-like and pillow-shaped and can be saturated with a cleaning fluid. The cleaning element 4 is located on a preferably dilatable strip 14 and can, for example, be replaced together with the strip 14. To this end, the cover of the cassette 1 comprises an opening at its upper side in the corresponding region. The rear portion of the carrier 11 is movably seated at the cassette, in particular by way of a spherical portion 15 which is movably seated in a corresponding ball socket 16 connected to the base plate of the cassette 1 and which is held in the ball socket 16 by way of the pin 17 located at the cover of the cassette 1.

Given a rotational motion of the tape drive capstan 3 in one of the two rotational senses, the drive wheel 5 and the worm 6 are likewise placed in rotation. The rotational motion is transmitted onto the eccentric arrangement 8 by way of the worm gearing formed of the worm 6 and the worm wheel 7 and, due to the eccentric shaft 11 which is embraced by the carrier 12, the carrier 12 executes a reciprocating motion perpendicular to the direction of motion of the magnetic tape relative to the magnetic head 2 in order to clean the latter. In case the magnetic head 2 is fashioned to be positionable, a motion, preferably a slow motion of the magnetic head 2 can be additionally executed perpendicular to the direction of movement of a magnetic tape. The cleaning element 4 thereby presses lightly against the magnetic head 2 and can be saturated with a cleaning fluid for cleaning.

It is also possible to drive the cleaning device by way of a drive arrangement of the magnetic tape recorder which is normally provided for driving one or both reel of the magnetic tape in the cassette. Further, it is possible to execute a reciprocating motion in the direction of movement of the magnetic tape in addition to the reciprocating motion perpendicular to the direction of ovement of a magnetic tape.

The second embodiment of the invention illustrated in FIG. 2 largely coincides with the first embodiment. A significant difference, however, is that the eccentric shaft 11 is not arranged parallel to the shaft 10, but is located inclined relative thereto. For example, the ends of the eccentric shaft 11 are rotated relative to one another in a range of from 45° through 75°, preferably 60°. Further differences with respect to the first embodiment are also that a further bearing 9 is provided, and that the carrier 12 comprises an opening 19 through which a guide pin 18 projects perpendicularly to the floor of the cssette. The guide pin 18 guides the carrier 12 during its oscillatory motion and, under given conditions, during its reciprocating motion and the opening 19 is fashioned such that these motions are possible. Finally, the second embodiment also differs in that the strip 14 with the cleaning element 4 is fashioned so that it, can be hinged out in order to replace the cleaning element when the cleaning element is fashioned to be pluggable onto the strip 14.

The plan view of the cassette 1 of the second embodiment is shown in FIG. 3 which illustrates the eccentric arrangement 8 which is composed of a shaft 10, the worm wheel 7 and the eccentric shaft 11. The eccentric arrangement 8 is rotatably seated in three bearings 9 and is driven via a drive wheel 5, and the worm 6 connected thereto, via the worm wheel 7. The eccentric shaft 11 is located inclined relative to the axis of the shaft 10 and, upon rotation of the eccentric arrangement 8, the carrier 12 is placed in reciprocating motion and, simultaneously, into the oscillatory motion which can also be interpreted as a pivoting motion or a partial rotary motion. In other words, as is clear from FIGS. 2-4, the cleaning element 4 rotates about an axis which extends from the cleaning element 4 in the general direction of pin 17, while the axis itself can be said to simultaneously translate back and forth in a complex motion between an extreme left and an extreme right position, i.e., in an oscillatory path, such that the translation of the axis about which the cleaning element 4 rotates, and therefore the translation of the rotating element 4 itself, has components both perpendicular to and parallel to the direction of tape travel. At its rear end, the carrier 12 is seated by the spherical part 15 and embraces the eccentric shaft 11 at the one side, for example, at the upper side, by way of the lateral seating surfaces and embraces the shaft 11 at the other side, for example, the underside, by way of the lip 13. The pivotal strip 14 may be seen at the front side of the carrier, the strip 14 being secured to the carrier via an articulation 21. When the carrier is fashioned of plastic, the articulation is formed, for example, as a film hinge. At its other end, the strip 14 comprises a catch nose 22 which can be inserted into a corresponding opening 23 of the carrier when the strip 14 is in its operating position. The strip 14 is slipped over the cleaning element which comprises a longitudinal opening. The cleaning element 4 is interchangeably secured on the strip 14 and, when the latter is hinged out, can be replaced or turned in a simple manner, so that it can be used from both sides. The cleaning element 4 is constructed pillow-like or felt-like and can be saturated with the cleaning fluid.

In the illustration of FIG. 4, the eccentric arrangement 8 is shown as a discrete component. As already set forth, it is composed of a shaft 10, the worm wheel 7 and of the eccentric shaft 11. Sections along the lines A—A and B—B are shown at both sides in FIG. 4, it proceeding therefrom that the ends of the eccentric shaft 11 are rotated relative to one another by an angle of, for example, 60°.

In the section through the carrier shown in FIG. 5, the spherical portion 15 may be seen at the rear end thereof. Also visible are the recess 19 for the guide pin 18 and the lip 13 which embraces the eccentric shaft 11 on the underside of the carrier. The opening 23 for the catch nose 22 of the strip 14 is shown at the front end of the carrier 12.

The drive wheel 5 illustrated in FIG. 6 forms a structural unit with the worm 6. The drive wheel 5 is fashioned as a friction wheel and, at its underside at the region of the worm 6, comprises a depression 20 for the worm wheel 7 in order to achieve a low structural height of the worm gearing.

Although I have described my invention by reference to particular illustrative embodiments thereof, many changes and modifications of the invention may become apparent to those skillediin the art without departing from the spirit and scope of the invention. I therefore intend to include within the patent warranted hereon all such changes and modifications as may reasonably and properly be included within the scope of my contribution to the art.

I claim:

1. A cleaning cassette adapted for insertion in a tape recorder having a rotating drive element which normally moves a magnetic tape in a direction of a tape travel across a magnetic head, said cleaning cassette comprising:
   a housing having an opening positioned adjacent said magnetic head when said cleaning cassette is inserted in said tape recorder;
   a carrier moveably mounted in said housing and having an end extending to said housing opening;
   a cleaning element mounted on said end of said carrier, said carrier holding said cleaning element against said magnetic head when said cleaning cassette is inserted in said tape recorded; and
   means rotated by said drive element and engaging said carrier for rotating said cleaning element about an axis and simutaneously translating said axis in an oscillatory path having components perpendicular to and parallel to said direction of tape travel, with said cleaning element maintained continuously against said magnetic head.

2. A cleaning cassette as claimed in claim 1, wherein said means for imparting said rotation of said cleaning element and said simultaneous translation of said axis about which said cleaning element rotates comprises:
   a first shaft rotatably mounted in said housing and having a longitudinal axis;
   a second shaft rotationally mounted in said housing and being eccentrically connected to said first shaft, said second shaft being coupled to said carrier and having a longitudinal axis disposed at an angle relative to the longitudinal axis of said first shaft; and
   means for drivingly coupling said first shaft to said drive element to rotate said first shaft.

3. A cleaning cassette as claimed in claim 2, wherein said means for drivingly coupling said first shaft to said drive element comprises:
   a third shaft rotably mounted in said housing;
   a drive wheel attached to said third shaft for co-rotation therewith in said housing and engageable with said drive element when said cleaning cassette is inserted in said tape recorded to rotate said third shaft;
   a worm on said third shaft; and
   a worm gear on said first shaft meshing with said worm on said third shaft.

4. A cleaning cassette as claimed in claim 1, further comprising spherical bearing means for moveably mounting said carrier in said housing.

5. A cleaning cassette as claimed in claim 4, wherein said spherical bearing means comprises a ball socket mounted in said housing and a ball mounted on said carrier received in said socket.

6. A cleaning cassette as claimed in claim 1, further comprising:
   means for removeably mounting said cleaning element on said end of said carrier.

7. A cleaning cassette as claimed in claim 6, wherein said means for removeably mounting said cleaning element comprises:
- a holder attached to said end of said carrier, said holder having spaced side walls, each wall having an aperture therein; and
- a strip to which said cleaning element is attached extending between said side walls of said holder, said strip having a hinge element at one end thereof received in one of said apertures, and a latch nose at an opposite end thereof received in the other of said apertures.

8. A cleaning cassette as claimed in claim 1 wherein said cleaning element is a pad.

9. A cleaning cassette as claimed in claim 8, wherein said pad is saturated with cleaning fluid.

10. A cleaning cassette as claimed in claim 1, further comprising a guide peg in said housing, said carrier havng a guide aperture through which said peg slideably extends.

11. A cleaning as claimed in claim 2, wherein said means for rotating said first shaft includes a worm and gear arrangement.

12. A cleaning cassette as claimed in claim 1, further comprising means for releasibly mounting said cleaning element to said end of said carrier.

13. A cleaning cassette adapted for insertion in a tape recorder having a rotating drive element which normally moves a magnetic tape in a direction of tape travel across a magnetic head, said cleaning cassette comprising:
- a housing an opening position adjacent said magnetic head when said cleaning cassette is inserted in said tape recorder;
- a first shaft rotatably mounted in said housing and having a worm thereon;
- means for coupling said first shaft to said drive element so that said first shaft is rotated about a longitudinal axis thereof;
- a second shaft rotatably supported in said housing and having a worm gear thereon meshing with said worm on said first shaft to rotate said second shaft about a longitudinal axis thereof;
- a carrier moveably mounted in said housing and having an end extending into said opening in said housing;
- a cleaning element mounted on said end of said carrier, said carrier holding said cleaning element against said magnetic head when said cleaning cassette is inserted in said tape recorder; and
- a third shaft extending through said carrier and eccentrically attached to said second shaft for corotation therewith, said third shaft having a longitudinal axis non-parallel to said longitudinal axis of said first shaft so that rotation of said third shaft with said second shaft rotates said cleaning element about an axis and simultaneously translates said axis in an oscillatory path having components perpendicular to and parallel to said direction of tape travel, with said cleaning element maintained continuously against said magnetic head to clean said magnetic head.

14. A cleaning cassette as claimed in claim 13, wherein said means for coupling is a disk rotatably mounted in said housing, said disk engaging and being rotated by said drive element when said cleaning cassette is inserted in said tape recorder, said first shaft being attached to said disk for corotation with said disk.

* * * * *